(12) United States Patent
Cook et al.

(10) Patent No.: US 7,095,409 B2
(45) Date of Patent: Aug. 22, 2006

(54) SHOT SHADING METHOD AND APPARATUS

(75) Inventors: Robert L. Cook, San Anselmo, CA (US); Thomas Douglas Selkirk Duff, Berkeley, CA (US)

(73) Assignee: Pixar, Emeryville, CA (US)

( * ) Notice: Subject to any disclaimer, the term of this patent is extended or adjusted under 35 U.S.C. 154(b) by 457 days.

(21) Appl. No.: 10/428,325

(22) Filed: Apr. 30, 2003

(65) Prior Publication Data

US 2004/0217958 A1    Nov. 4, 2004

(51) Int. Cl.
*G06T 17/00* (2006.01)
(52) U.S. Cl. ..................................... 345/426
(58) Field of Classification Search ................ 345/418, 345/419, 426, 427, 428
See application file for complete search history.

(56) References Cited

U.S. PATENT DOCUMENTS

| | | |
|---|---|---|
| 5,649,032 A | 7/1997 | Burt et al. |
| 6,064,393 A | 5/2000 | Lengyel et al. |
| 6,266,053 B1 | 7/2001 | French et al. |
| 6,278,466 B1 | 8/2001 | Chen |
| 6,573,898 B1 | 6/2003 | Mathur et al. |
| 6,791,563 B1 * | 9/2004 | Bragg et al. ................ 345/582 |
| 6,933,941 B1 * | 8/2005 | Peercy et al. ............... 345/428 |
| 6,940,507 B1 * | 9/2005 | Repin et al. ................ 345/424 |

OTHER PUBLICATIONS

Cook et al., "The Reyes Image Rendering Architecture", Computer Graphics, vol. 21, No. 4, 1987, pp. 95-102.

* cited by examiner

*Primary Examiner*—Matthew C. Bella
*Assistant Examiner*—Cliff N. Vo
(74) *Attorney, Agent, or Firm*—Townsend and Townsend and Crew LLP

(57) ABSTRACT

A method for shading objects in a first image and a second image includes receiving a geometric description of a first object, performing once for both the first image and the second image, a first set of shading operations for the first object, performing a second set of shading operations for the first object in the first image, performing a third set of shading operations for the first object in the second image, combining results of the first set of shading operations for the first object and results of the second set of shading operations for the first object to determine shading values of the first object in the first image, and combining results of the first set of shading operations for the first object and results of the third set of shading operations for the first object to determine shading values of the first object in the second image.

33 Claims, 6 Drawing Sheets

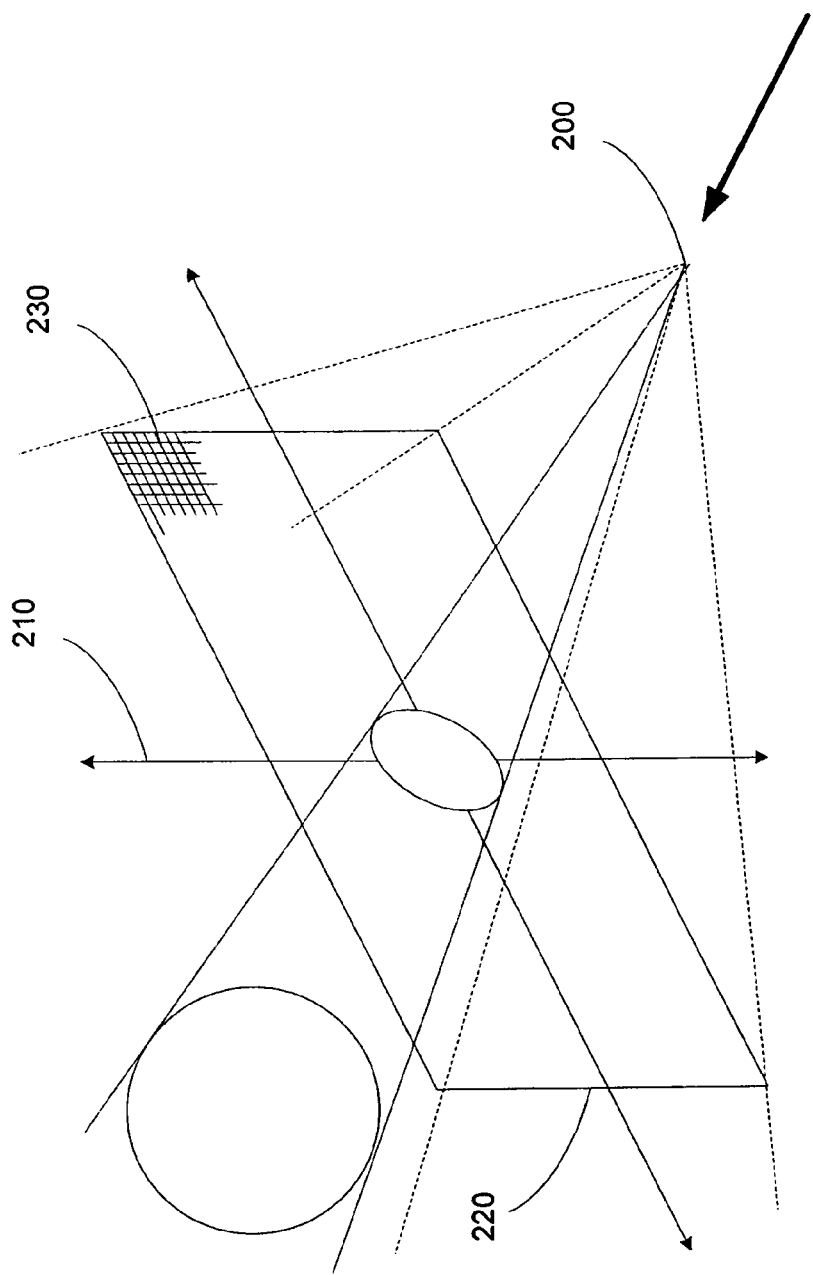

SHOT SHADING METHOD AND APPARATUS

CROSS-REFERENCES TO RELATED APPLICATIONS

The present invention is related to and incorporates by reference for all purposes the following co-pending patent application Shot Rendering Method and Apparatus, U.S. patent application Ser. No. 10/428,321, filed Apr. 20, 2003.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to computer animation. More particularly, the present invention relates to techniques and apparatus for efficient rendering of related image frames.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CA) industry was Pixar. Pixar developed both computing platforms specially designed for computer animation and animation software now known as RenderMan®. RenderMang® was particularly well received in the animation industry and recognized with two Academy Awards®.

The named inventor of the present invention co-developed the original RenderMang® software. During this time, he made several engineering assumptions which affected the operation of the software. One assumption was that a geometric description of scene stored in memory was relatively small. The geometric scene description typically included the geometric description of a location, objects, object placements, and the like. The named inventor also assumed that the resolution of the output image frame was large and could not be economically stored in computer program memory.

In light of these assumptions, when it came time to render a frame, the geometric scene data would first be moved from disk memory to program memory. The frame would then be subdivided into a series of smaller frame portions, termed buckets, and portions of any object appearing in a bucket, would then be rendered. This process would then be repeated for the remaining buckets in the frame, until the frame was rendered. The process would thus render all objects in one frame, before beginning the next frame. In some respects, the animation process of RenderMan® was similar to the traditional animation techniques, mentioned above, in that one frame would be rendered at a time. Although parallel processing techniques were available and implemented, each frame would still be individually and separately rendered distinctly from other frames.

In light of the above, the inventors of the present invention have realized that it is desirable to make further enhancements in the area of animation software to facilitate the process of making animated features.

BRIEF SUMMARY OF THE INVENTION

The present invention relates to the field of computer animation. More particularly, the present invention relates to techniques and apparatus for efficient rendering of related image frames.

The present invention represents a paradigm shift in rendering in the computer aided animation field. The inventors have recognized that using a different set of engineering assumptions they can greatly reduce the rendering time. One assumption, among others, is that that the scene description is large and expensive to store in computer program memory, and another assumption is that the image resolution is "small," and images (frames) can be easily stored in computer program memory. By way of example, a typical scene description may be on the order of 300 gigabytes, and an image may be on the order of 300 megabytes.

Making these assumptions, the inventors have recognized that they can now efficiently render objects in a series of related images (a "shot") to decrease the total rendering time. Each image is also referred to herein as a "frame" or "image frame." To implement this novel idea, the geometric scene data is streamed from the hard disk to a rendering engine, one object at a time. The rendering engine then renders each object for all image frames in the shot in which the object appears.

For example, an object is first retrieved from the disk drive, and the rendering engine determines a polygonal dicing schema for the object. Next, the rendering engine performs a displacement map on the polygonal dicing schema for the object. The rendering engine then performs certain time-invariant shading calculations on the object, i.e. shading calculations that are common for the object for the frames in the shot. These preceding calculations are termed herein "shot specific," "shot invariant" or "time-invariant" rendering. For instance, for a shot including 80 frames, instead of performing shot invariant shading calculations 80 times for the object in the 80 different frames, the rendering engine performs the shading calculations, once, for the object for all 80 frames. In another instance of this example, the rendering engine performs the shading calculations less than 80 times.

Next, the rendering engine calculates "image specific" or "frame specific" rendering, such as time varying shading calculations. For each frame, the shot specific rendering and frame specific rendering results are then combined to form a final image frame. These shading operations may be performed serially or concurrently.

According to one aspect of the invention, a method for shading objects in a plurality of images including a first image and a second image is described. One technique includes receiving a geometric description of a first object, and performing once for both the first image and the second image, a first set of shading operations for the first object in response to the geometric description of the first object. Methods may also include performing a second set of shading operations for the first object in the first image, and performing a third set of shading operations for the first object in the second image. Various methods also include combining results of the first set of shading operations for the first object and results of the second set of shading operations for the first object to determine shading values of the first object in the first image, and combining results of the first set of shading operations for the first object and results of the third set of shading operations for the first object to determine shading values of the first object in the second image.

According to another aspect of the invention, a method for shading a plurality of objects in N number of images is described. One technique includes performing shading calculations for an object from the plurality of objects for the N number of images at one time. Further, a first set of the shading calculations for the object are performed in response to geometric data for the object no more than M times where M is less than N.

According to yet another aspect of the invention, a computer program product for shading objects in a plurality of images in a computer system including a processor is disclosed. The computer program product may include code that directs the processor to perform a first set of shading operations for a first object M times for N number of images, code that directs the processor to perform a second set of shading operations for the first object N times for the N number of images, and code that directs the processor to combine the first set of shading operations for the first object and the second set of shading operations for the first object to determine shading values for the first object for the N number of images. In various embodiments, M<N. The computer codes typically reside on a tangible media such as volatile memory, optical memory, hard disk drives, network storage drives, or the like.

According to yet another aspect of the invention, images including object shaded according to the above methods are disclosed.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 2 is a diagram illustrating terms used the present application;

DETAILED DESCRIPTION OF THE INVENTION

Figure 1:
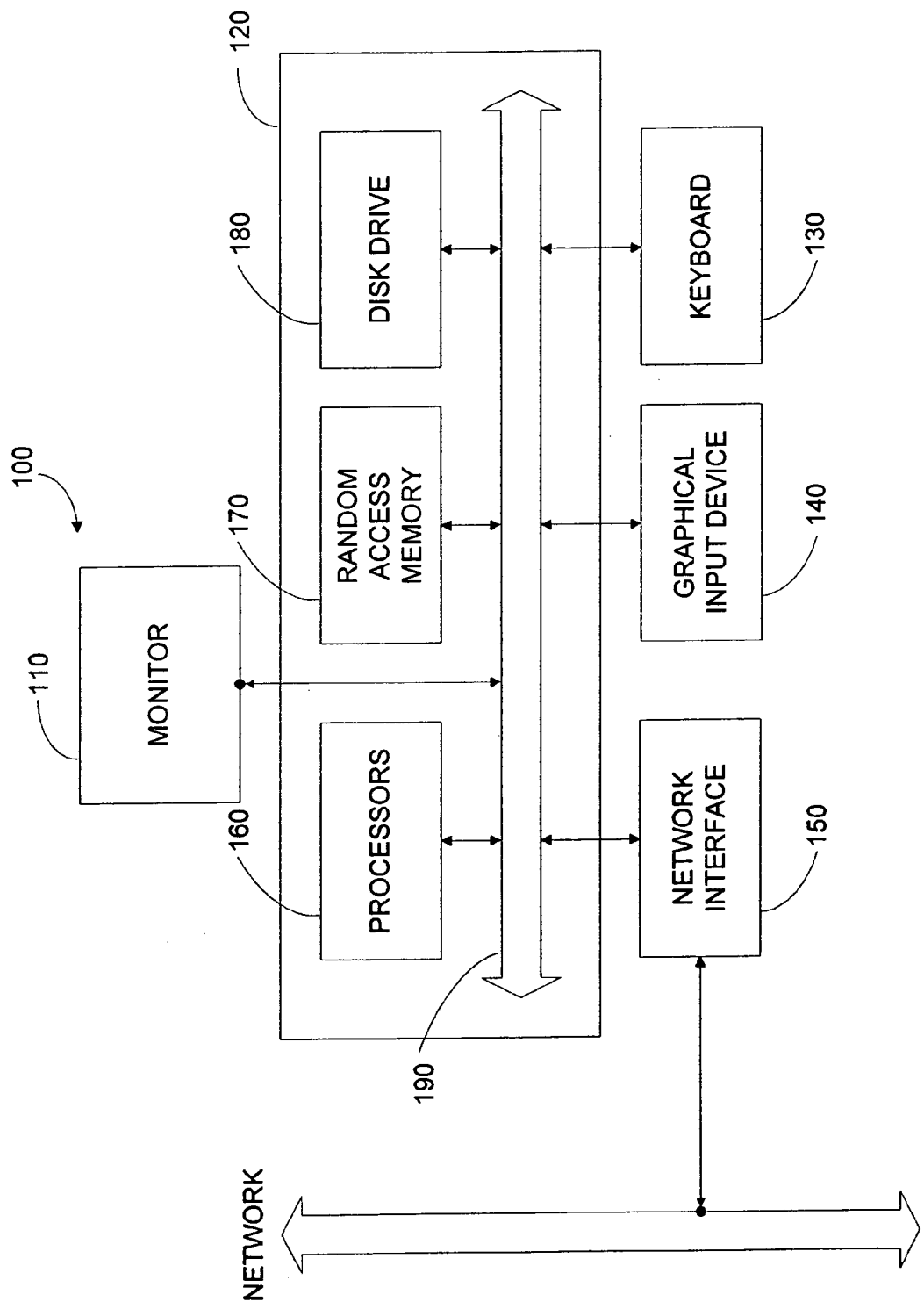
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, displacement maps, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

FIG. 2 is a diagram illustrating terms used the present application. In particular, as illustrated, a virtual camera 200 is defined for each image. Virtual camera 200 is associated with an image plane 210, which defines the two dimensional plane where the image will be recorded to. From image plane 210, a screen window 220 is defined that defines the outer bounds of the image to be rendered. Pixel locations 230 are then defined within screen window 220.

In one embodiment of the present invention, screen window 220 has a pixel resolution of 2000 horizontal pixels and 1000 vertical pixels. In other embodiments of the present invention, a higher or lower pixel resolution in the horizontal or vertical direction is envisioned.

Figure 3A:
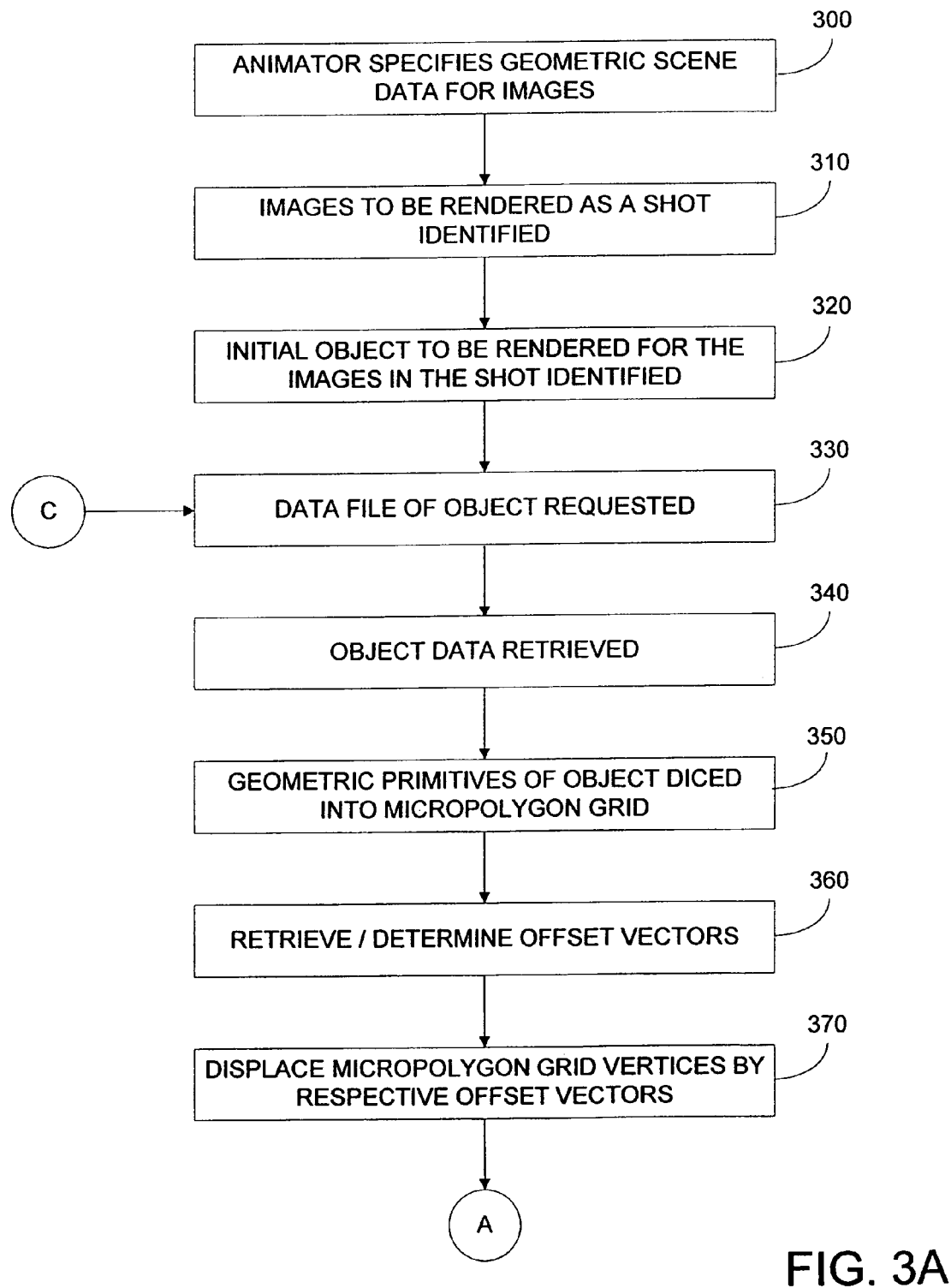
FIGS. 3A–C illustrate a block diagram of a flow process according to an embodiment of the present invention.
Figure 3B:
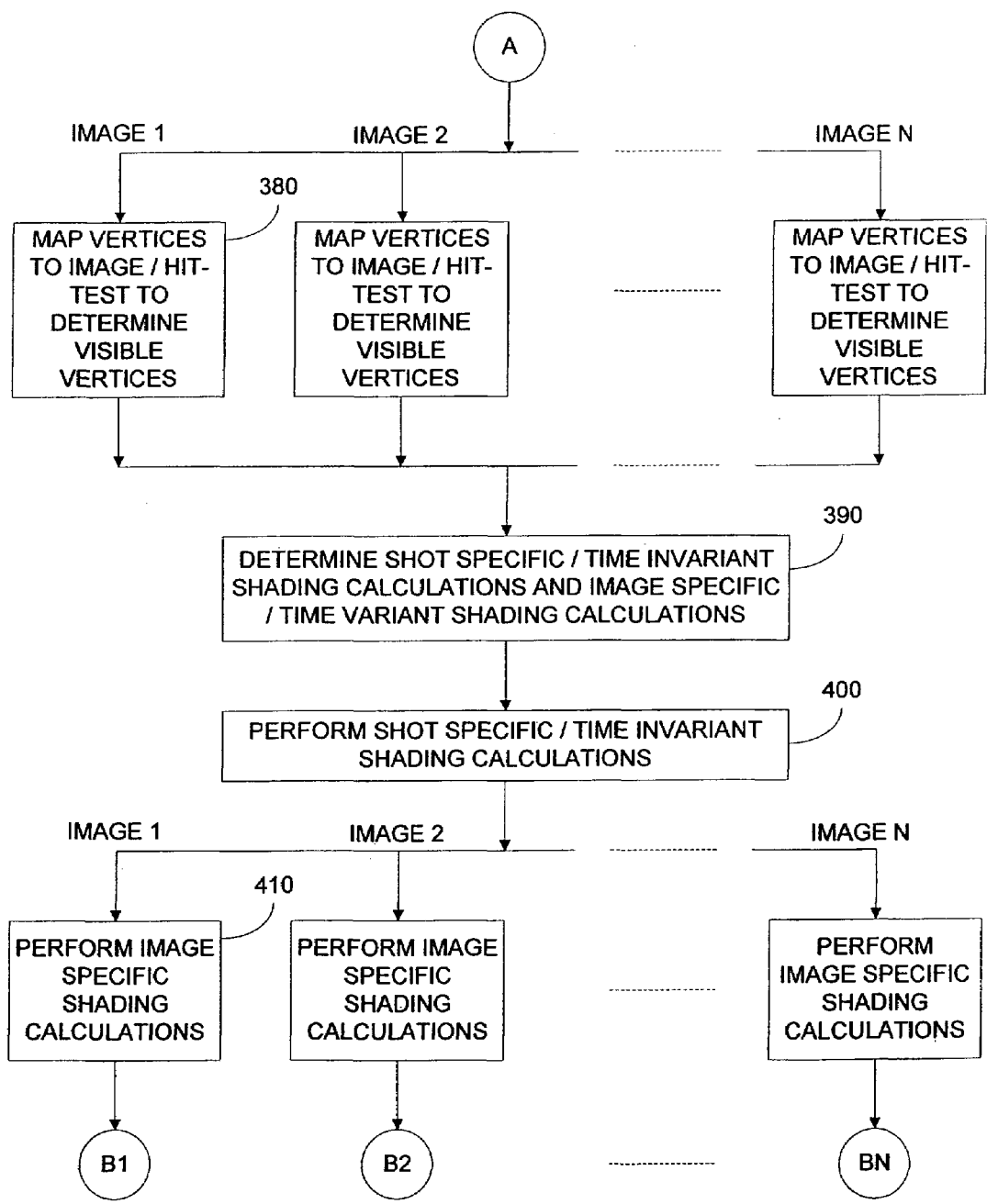
Figure 3C:
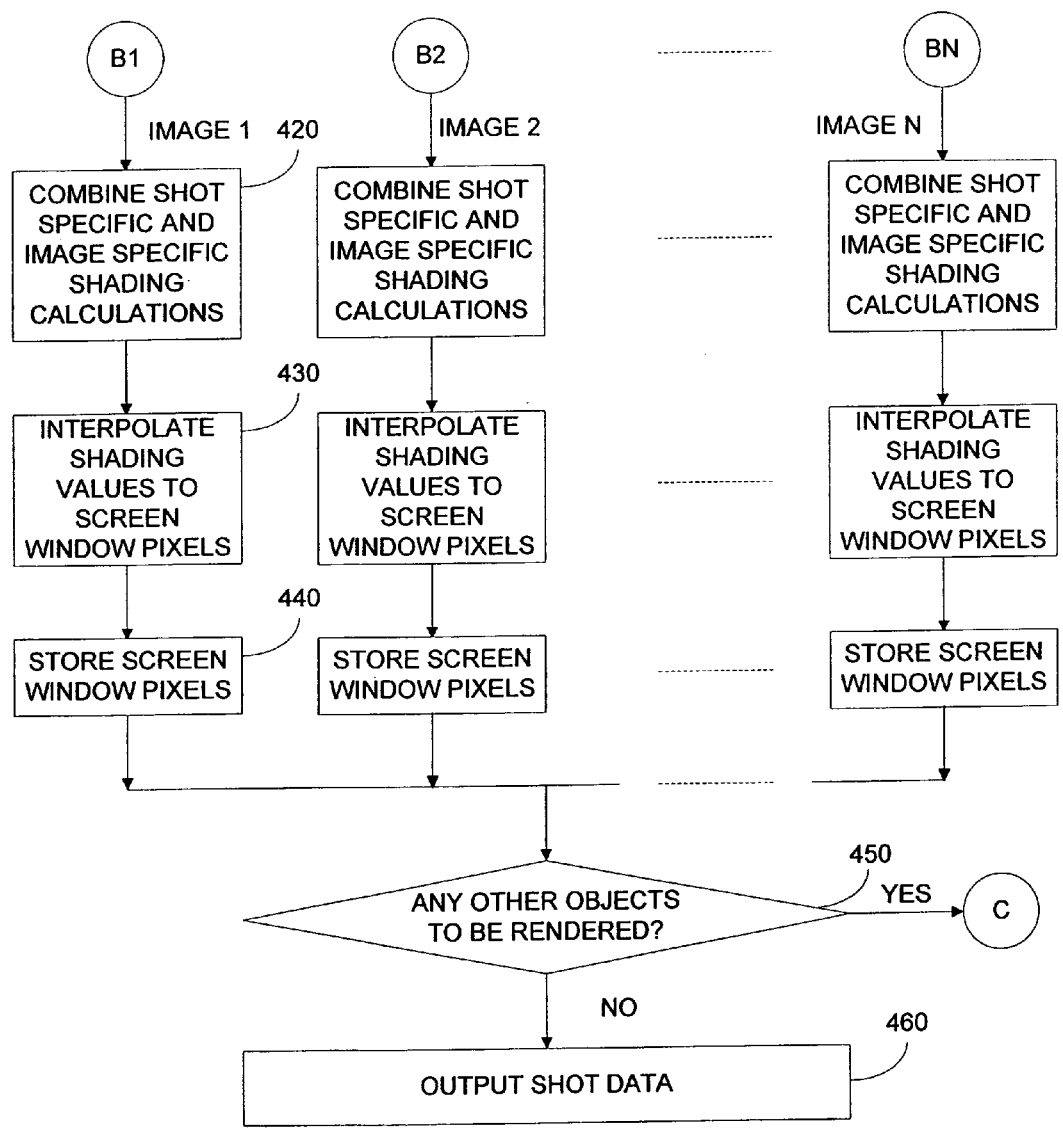

FIGS. 3A–C illustrates a block diagram of a flow process according to an embodiment of the present invention. More particularly, the block diagram discloses a process in which individual frames (images) of an animation are rendered substantially simultaneously or close in time.

In the present embodiment, the individual frames that are to rendered at substantially the same time are termed a "shot" of images. A shot may include two or more frames of animation, and may include successive frames in time, may include frames representing the same time (but with different cameras, lighting, etc.), or may include frames separated in time.

In one embodiment of the present invention, the process begins with the specification of images to be rendered, step 300. In this example, image specification includes the specification of one or more scene backgrounds, the specifications of objects and textures in the images, the specification of lighting to be applied to the images, the specification of object placement data, the specification of animation parameters for objects in the scene, displacement maps, and the like. Typically, images are specified by one or more animators using conventional three-dimensional modeling techniques and software currently available. For example, software such as Alias|Wavefront's Maya™ Software, and the like may be used to specify the scene.

In the present examples, a specification of a background typically includes a geometric specification of a location or a "set" into which objects, described below, are placed. The geometric specification may include geometric boundaries, one or more "environment" maps, and the like. These environment maps may be static or may vary with time. In examples of the present invention, a set may represent any location where the objects are placed, such as a room, an interior location, an exterior location, or the like.

The objects are placed or positioned by the animator into the set. These objects may be inanimate objects within a scene such as furniture, plants, vehicles, and the like. Additionally, these objects may be objects that move or are moved within the scene, for example, characters, chairs, doors, and the like. In the present embodiment, objects may be simple to complex, with some objects being formed from one or more smaller objects. In some embodiments, only portions of objects may be retrieved from a memory, and the remaining portions of the objects are dynamically created before being rendered. As merely an example, the character Sullivan™ in the movie Monsters, Inc.™ includes over three million hairs objects, however, only about one million hair objects are stored in memory with the remaining two million hair objects generated on the fly. In such cases, the dynamically created objects are termed procedurally generated objects.

In the present embodiment, objects are typically stored separately from each other. That is, each object may be stored in its own file and be retrieved by a computer file system. In other embodiments of the present invention, data for more than one object may be included into a single file.

The specification of objects in the images may also include a specification of surface treatment of such objects. For example, a single object in an image may be associated with multiple surface treatments, such as texture maps specifying base texture, dirt, scuffs, bumps, displacements, mathematical equations, and the like. In the present embodiment, the surface treatments are typically stored as separate files from the objects. In other embodiments, objects and associated surface treatments may be integrated into a single file.

The location of where objects are placed or positioned in the images are typically specified by an animator. For some objects that do not move within the images, the placement location is static, i.e. shot invariant. However for objects that do move in the shot, the placement data typically represents an original location and/or orientation for the object. The location of the moving object as it moves within the different images is then determined by the animation parameters.

In the present embodiment, each scene typically includes a specification of light sources and lighting parameters. Lighting data may include light sources, light types (e.g. diffuse, point), lighting locations, lighting directions, and the like. This lighting data may be stored within a single file or multiple files.

In this example, animation data for an object moving in a scene typically may include a specification of where moving objects are initially placed in the scene, and include data regarding where specific objects move within the images. In the present embodiment, the data may specify specific points in space, or may specify an equation that determines points in space, or the like. Many conventional methods may be used to specify the animation data. In this embodiment, the animation data may be stored in an individual file, or may be combined with one or more of the data elements described above.

In FIG. 3A, the next step illustrated is to identify multiple images that will make-up a "shot" of images, step 310. In one embodiment, the shot may include sequential frames. In other embodiments, shots may include multiple images using the same geometric background and objects but at different times (non-sequential frames), shots may include multiple images using the same geometric background and objects but from different camera angles ("angles"). In yet another embodiment, shots may include multiple images using the same geometric data and objects with "bracketed" rendering parameters. In other words, the images in the shot may have almost substantially the same rendering parameters, but have one (or more) rendering parameters that are bracketed, as is common with conventional photography, e.g. +1EV, +0EV, −1EV adjustment. In embodiments of the present invention, rendering parameters that may be bracketed may include varying of one or more light intensities, varying a texturing of a surface, e.g. surface roughness, varying of a light position, varying of "barn door" light boundaries, varying of texture noise frequencies (procedural texture-based noise with frequency controls), and the like. In these cases, the dicing, surface-hiding, and much of the shading operations, and the like may be performed once for the shot. In the embodiments below, images within a shot typically share similar geometric scene data, object data, and the like.

In this embodiment, a "first object" is estimated by the rendering system as the object closest to the image plane for the different images in the shot, step 320. In the present embodiment, the rendering system may estimate which object is closest to the camera based upon the object placement data. In other embodiments, any object may be selected as the "first object," for example, the least complex object, an object that appears in the most number of images in the shot, selected objects (e.g. the main characters), and the like.

In one embodiment of the present invention, the object is then requested, step 330. In this example, the request may be for a file from a local disk drive or a network drive that includes the object and/or other objects. Because the object may be made-up of two or more sub-objects, the data file may include a specification of multiple sub-objects. In the present embodiment, a typical scene description is large, as merely an example, on the order of 300 gigabytes or greater. Accordingly, the inventors have determined that one object at a time can be processed from the scene description data.

In response to the request, the object is stored in program memory, step 340. In one embodiment, streaming technology is used so that the rendering engine can begin processing the object, although the entire data file has not yet been completely retrieved by memory. In other embodiments, the rendering engine begins processing the object after it is retrieved from memory. The object is typically made-up of one or more geometric or modeling primitives.

In one embodiment of the present invention, the object is dynamically determined based upon an initial specification of the object. For example, portions of the object may be specified and stored on a network drive, or the like. Next, when the object is requested, the portions of the object that are specified may be used to dynamically construct the remaining portions of the object.

In the present embodiment, once the object is specified, the geometric primitives are decomposed into a polygonal mesh or grid, step 350. The process of decomposing an object into small polygons is termed "dicing" as it is understood in the industry. Many conventional techniques may be used to dice the object, for example, dicing may divide the object into triangles, four-sided polygons, and the like. In the present embodiment, each of the small polygons is set to be approximately the same size of a pixel in the image plane, although in other embodiments, the size may be smaller or larger. In this example, the vertices of the small polygons are identified and the coordinate locations of the vertices are stored in program memory or in disk memory.

In the present embodiment, the object is preferably diced once, only when the object is its closest position to the image plane for all images in the shot. By doing so, the rendering system does not need to redice the object when it appears in the other images in the shot. In other embodiments, if there is a large difference in size of the object between different images in a shot, the rendering system may determine that redicing the object may be advantageous. Example of these embodiments are illustrated in FIGS. 4A–B.

Figure 4A:
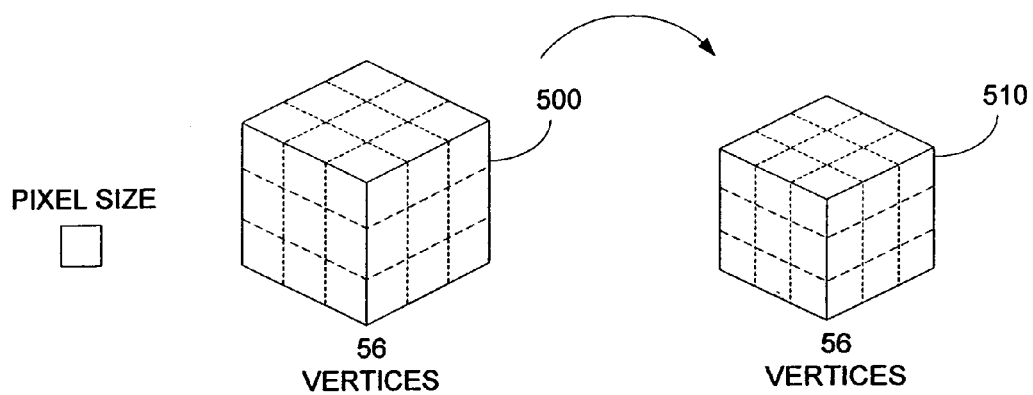
FIGS. 4A–B illustrate examples of embodiments of the present invention.
Figure 4B:
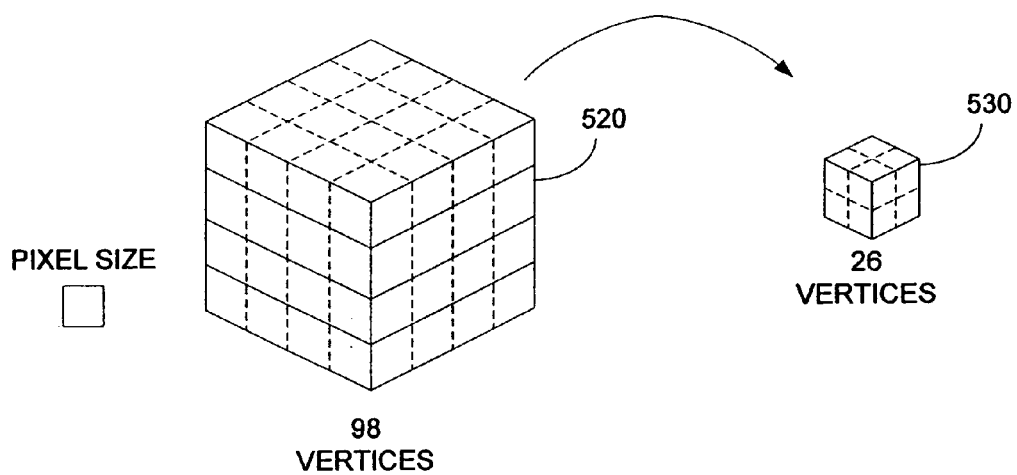

FIGS. 4A–B illustrate examples of embodiments of the present invention. In FIG. 4A an object appears in one frame as object 500, and in another frame as object 510. As can be seen, object 500 has been diced using conventional algorithms, and the resulting polygonal grid includes 56 vertices. In one embodiment, the rendering system may use the same polygonal grid (56 vertices), for object 410 in an image. By doing so, the rendering engine does not need to redice the object when rendering the object.

In another embodiment, the rendering system may selectively redice an object that was previously diced. For example, in FIG. 4B, an object appears in one frame as object 520 and in another frame as object 530. The initial dicing of object 520 is shown by the polygonal grid that specifies 98 vertices. This dicing may then be used when rendering the object in other images within the shot. However, in some cases, the rendering engine may determine that the object should be rediced. For example, if the object appears as object 530 for a substantial number of images in the shot, the rendering engine may determine that the dicing used for object 520 is not needed for most images. Accordingly, the rendering engine may redice the object, as illustrated in object 530 (26 vertices) and use this dicing for the object in different images in the shot. Such an embodiment would reduce the rendering time of the object.

Returning to FIG. 1, the rendering engine next performs a displacement mapping operation on the object. The concept of displacement mapping was pioneered by Robert L. Cook, a named inventor of the present application. With displacement mapping, object surfaces could easily be given small geometric surface details, such as bumps, grooves, crust, roughness, or even a pattern.

In the present embodiment, the rendering engine implements a displacement "shader," described further below, to perform this mapping. In operation, the rendering engine retrieves the vertices P from the dicing process above and then retrieves a set of offset vectors, step 360. Next the rendering engine offsets the positions of vertices P according to the respective offset vectors, step 370. In the present embodiment, the set of offset vectors may be a random noise-type pattern, an equation, a predetermined pattern, or the like. Further, the offset vectors may be along the surface of the object (x, y directions), normal to the respective vertices P (+/−z direction), or the like.

During the shading process, described below, a normal vector N is calculated for each vertex P, based upon the post-displacement position of vertex P. In the present embodiment, the post-displacement vertices locations may be stored in program memory or stored on disk.

In one embodiment of the present invention, a very few number, sometimes only one, dicing scheme and one set of post-displacement vertices is used for the object when rendering all images a shot. The inventors of the present invention have discovered that when rendering the object for multiple images in a shot, if different sets of dicing schemes and post-displacement vertices are used from image to image, undesirable effects may appear on the surface of the object. For example, if the dicing rate is different for different images in a shot the surface may seem to undulate or to move. Accordingly, to reduce unintended variations in the surface of an object within a shot, only one dicing rate is used in rendering the object.

In other embodiments, more than one set of post-displacement offset vertices may be used to represent the object in different images in a shot. In the example illustrated in FIG. 4B, when an object changes size dramatically within different images within a shot, the rendering engine may use a different dicing scheme and a different set of post-displacement offset vertices for the object. For example, the rendering engine may use a first set of post-displacement offset vertices for the object in more than one image in the shot, when the object is close to the image plane, such as object 520. Further, the rendering engine may use a second set of post-displacement offset vertices for the object in more than one image in the shot, when the object is far away from the image plane, such as object 530.

In other embodiments of the present invention, bump mapping techniques may also be implemented. For example, using bump mapping techniques the normals N associated with each respective vertex P is modified to form a set of modified normals. The set of modified normals is then used by the rendering engine to calculate the appearance of the object in images in the shot. In contrast to displacement mapping, however the vertices P are not actually moved or displaced. In the present embodiment, the above operations (steps 340–370) are time invariant, or shot-specific rendering operations. In other words, these rendering operations are the same or substantially similar for more than one frame in the shot. Accordingly, to decrease rendering time, the substantially similar rendering operations are not repeated for all the frames in the shot, e.g. the geometric data is pulled from storage once, vertex displacement is performed once, etc. Many other types of time invariant rendering operations can be included in other embodiments such as texturing operations, procedural geometric data generation, and the like.

Returning to the embodiment illustrated in FIGS. 3A–C, some of the following steps are generally performed for each image in the shot. In other words, some of the steps described below are typically performed for an object in the context of each individual image in the shot, i.e. image or frame specific, not shot specific.

From an implementation point of view, in one embodiment, the rendering of each object may be associated with a concurrent processing thread within the rendering engine. In some embodiments, the rendering engine is typically run on a multi-threaded operating system, accordingly, these processing threads may be executed at different times. For example, some processing threads may be performed at substantially the same time, some processing threads may complete ahead of other processing threads, some processing threads may overlap, and the like. In embodiments, these processing threads may be scheduled to be run at substantially the same time or sequentially. In other embodiments, the rendering of each shot is associated with one processing thread.

The rendering process continues in FIGS. 3A–C. In this embodiment, the object is typically positioned within the coordinate system for each image. Specifically, object may be scaled to the size it will appear in the image, if necessary, and oriented in the correct orientation (collectively positioning data). In one embodiment, to do this, the rendering engine modifies the set of post-displacement offset vertices for each image by the respective positioning data for the object for each image. In other embodiments, additional operations may be performed on the object, including deformations, and the like.

Next, a hit-test process for the object is performed, step 380. In this embodiment, the hit test includes comparing the location of each vertex in the object to data in a z-buffer. Thus, for each vertex that is closer to the image plane than any data in the z-buffer, the vertex is considered visible, and thus potentially renderable. Similarly, if a vertex of an object has a z-depth larger (farther away from the image plane) than data in the z-buffer, that vertex is hidden. The inventors thus recognize that hidden vertices need not be rendered, thus reducing rendering time.

In the present embodiment, the z-buffer is then updated with depth information from the object. This z-buffer data may then be used for hit-test operations for the next successive object to be rendered.

In the present embodiment, an additional test is the comparison of each vertex to outer dimensions of an screen window in the image plane. In other words, the hit-test may include determining whether each vertex in the object has an x-y value that is within the image to be rendered. The vertices within the screen window are potentially renderable, and vertices outside the screen window need not be rendered. After this step completes, for each image where the object is potentially visible, the locations of the vertices of the object that are both within the screen window and visible are then stored in program memory or disk memory.

In this embodiment, as illustrated, this step is performed for each image in the shot, i.e. the hit-test is specific for each image. This is because objects may be in different orientations in different images, the camera parameters (e.g. location, direction, field of view) may change from one image to the next, and the like. Because, the rendering engine cannot typically rely on the hit-test results of an object in one image to the next image, this step is typically performed for each image in which the object is potentially visible. In embodiments of the present invention, these processes may spawned independently of each other, they may be sequential, parallel, overlapping, or the like. In one embodiment, the hit-test operation is a image-specific rendering operation. Many other types of image-specific rendering operations can also be performed such as other visibility operations, ray tracing operations, and the like.

In other embodiments, such as the "bracketing" embodiments described above, different images in the shot may have bracketed rendering parameters, but the remaining rendering operations remain substantially the same. For example, in the case of hit-testing, if the orientation of objects in the scene do not move and/or the camera is "locked-down," the hit-test operation is not image-specific, but is time-invariant. Accordingly, the hit-test operation need only be performed as little as once for the shot.

In still other embodiments of the present invention, certain rendering operations, may be image-specific for some objects in an shot, and may be time-invariant for other objects in a shot. In other words, some rendering operations may be image-specific for one object in an image, but may be time-invariant for another object in the image. For example, in a shot where background objects are locked-down, hit-test operations for those objects in the images in the shot may be time-invariant, and if the foreground objects move, hit-test operations for those objects in the images are time-varying or image specific. As another example, shading operations run on the background objects may be time-invariant in the shot, whereas the same shading operations run on the foreground objects may be time varying and image specific. In other embodiments, within a shot, some rendering operations for an object may be time-invariant for a first set of frames in a shot, and time-varying for a second set of frames in a shot. In light of the present patent application, one of ordinary skill in the art may be apply these concepts to numerous other embodiments not specifically disclosed herein.

In this embodiment, the following steps represent an object shading process. Pixar's rendering technology uses a "shading language" to describe the interactions of lights and surfaces. More specifically, with RenderMan™, Pixar introduced a shading language that described the output of light sources and how the light is attenuated by surfaces of objects in an image.

In the current embodiment, a typical shader includes shading functions and parameters that may or may not change over time. For functions and parameters that do not change for an object between images in the shot, such shading functions are termed "invariant" shading functions (shot specific). Further, shading functions that do change for an object between images in a shot, are termed "variant" shading functions (image specific).

An example of a simple surface shader for an object that is made from plastic is illustrated below:

```
surface
paintedplastic (    float Ka = 1, Kd = .5, Ks = .5, roughness = .1;
                    color specularcolor = 1;
                    string texturename = 'texture'";)
{
extern vector N, I;
extern color Cs;
    color Ct = Cs;
    if(texturename != "")
        Ct *= color texture (texturename);
    normal Nf = faceforward (Normalize(N), I);
    vector V = -normalize (I);
    Ci =    Ct * (Ka * ambient ( ) + Kd * diffuse (Nf)) +
            specularcolor * Ks * specular (Nf, V, roughness);
    Oi = Os;
    Ci *= Oi;
}
```

For this shader:

Ka represents a user defined ambient light parameter;
Kd represents a user defined diffuse light parameter;
Ks represents a user defined specular parameter;
roughness represents a user defined surface roughness parameter;
N represents a normalized vector from a surface position;
I represents a vector from the viewing position to the surface position;
Nf represents a vector component of N towards the viewing position;
V represents a normalized vector from the surface position to the viewing position;
specularcolor represents a user defined specular color parameter;
texture represents a user defined filename of a texture map;
Cs represents a default surface color parameter of the object;
Ct represents the default surface color parameter multiplied by a texture map "texture;"
function ambient ( ) returns a light contribution of a non-directional light;
function diffuse (Nf, V) returns a light contribution from an approximation of widely and uniformly scattered reflections;
function specular (Nf, V, roughness) returns a light contribution due to specular relections of a surface from a light source; and
Ci represents a local illumination model for the object.

Using the example above, many of the parameters, such as Ka, Kd, Ks, roughness, texture, specularcolor, and the like are normally held constant throughout the shot (shot specific). However, these parameters may be defined as a function of time, i.e. may be time variant shading functions (image specific). For example, such parameters may change if objects and lights move with respect to each other within a shot. As another example, to render a chameleon-type object that changes colors during the shot, the parameter Cs may change vary with time.

In a large number of cases, some of the other shading parameters for an object are a function of time (image specific). For example, the vector I changes as the camera is moved between image frames, the functions ambient( ), diffuse( ), and specular( ) change as lights are added, subtracted, or repositioned between image frames. The inventors have recognized that time variant and invariant shading functions are typically know ahead of time. Accordingly, the inventors can identify the time invariant shading functions and the time variant shading functions to the rendering engine.

In the present embodiment, the rendering engine receives this shading information from the animator ahead of time. This information typically identifies which inputs to the shading calculations do not depend on time for the object (shot-invariant) and which calculations do depend on time (image specific), step 390.

In other embodiments of the present embodiment, the rendering engine may automatically dynamically identify or determine which shading calculations for the object are identical for the frames in the shot by analyzing the inputs used in by the shaders for the object. Ways to perform this may include the rendering engine determining which shading operations have input parameters that vary for the different frames in the shot.

The rendering engine next performs the time invariant shading calculations for the object, step 400. As an example, referring to the shading code above, if the default surface color Cs and the texture map do not depend upon time, Ct may be calculated for the object for the shot. Typically these calculations result in one or more intermediate shot shading values for the object. These intermediate shading values may be stored in program memory or on disk memory.

Next, the time variant shading functions are calculated for the object in each image in the shot, step 410. For example, if one or more lights move or are turned on/off in a series of images, or the object or the camera moves between images, the function specular (Nf, V, roughness) is executed for each image. These intermediate image shading values may also be stored in program memory or on disk memory.

In the current embodiment, for each image, the rendering engine then performs the final shading computations for the object in the shot, step 420. In one embodiment, the intermediate shot shading values and the intermediate image shading values for the object are mathematically combined resulting in a final shading value for most of the grid locations of the object. In other embodiments of the present embodiment, steps 410 and 420 may be performed together. For example, the intermediate shot shading values may be used as input to step 410 to determine the final shading values for the object in a single step.

In embodiments of the present invention, steps 410 and 420 need not be sequential. For example, in other embodiments step 420 may be after step 410. In still other embodiments, time invariant shading calculations are interleaved with time varying shading calculations. For instance, a time invariant rendering operation is performed, two time varying rendering operations are performed, another time invariant rendering operation is performed, another time varying rendering operation is performed, etc. This process may continue until all rendering operations are performed. In another embodiment, a time varying rendering operation is performed before the first time invariant rendering operation.

In embodiments of the present invention, a rendering operations (time invariant and/or time varying) may be either independent or dependent of the results of a prior rendering operation. That is a the results of a first rendering operation may be used by a successive rendering operation in one embodiment. The first rendering operation may or may not be performed immediately prior to the second rendering operation, in various embodiments.

The results of the shading process above are typically a two-dimensional grid of color values mapped from the visible polygonal grid locations. In the present embodiment, the two-dimensional grid of color values are then interpolated to determine values of the surfaces at the hit test locations, these values are then interpolated to determine pixels in the screen window, step 430. Alternatively for some objects, some of the per frame shading operations may need to be performed at the hit test locations, not at the polygon grid locations. This is relevant for rendering operations such as motion blur operations, e.g. an object moving through a spotlight.

In embodiments of the present invention, any conventional method of interpolating from the grid to the hit test locations and to the screen window may be used, for example, a sampling matrix such as 4×4 or 11×11. Many other methods for determining pixel values may also be used, such as bi-linear interpolation, and the like. Additional embodiments may utilize the invention disclosed in U.S. Pat. No. 4,897,806, assigned to the same assignee, and incorporated herein for all purposes.

In the present embodiment, the pixel values in the screen window representing the object are then stored for every image in which the object appears, step 440. In one embodiment, if the object is the object to be rendered, the entire 2000×1000 pixel screen window may be stored in program memory, disk memory, network storage memory, or the like. If the object is a second, or subsequent object, in this embodiment, only those pixels representing such objects are updated. In another embodiment, to update an image with a newly rendered object, the process may be an implementation of the following: new image=old image+new object for each image in the shot.

The process described above may then be repeated for subsequent objects in the shot until all objects in the shot are rendered, step 450. When all objects have been rendered, the resulting images in the shot may then be output for viewing, converted to analog form (e.g. film, video tape), formatted for a digital media output device, or the like, step 460.

In one embodiment of the present invention, a typical shot may represent 1 second to 30 seconds of images. In the present example, there are approximately 24 image frames per second, accordingly, a shot may be from 24 to 720 image frames. In other embodiments, a shot may be from 12 frames to 1000 frames, may be from 2 to 2400 frames or greater, and the like.

In operation, it is believed that substantial savings in rendering time may be achieved using embodiments of the present embodiment. For example, to render a typical animated movie, up to 90% of the rendering time may be attributed to shading and 10% to other rendering steps, e.g. hiding, displacement mapping, and the like. Of the 90%, 50% of the time may be attributed to image specific shading and 50% of the time may be attributed to shot invariant shading. Using embodiments of the present invention, in this example, the shot invariant shading time can virtually be eliminated, thus the total rendering time may be cut almost in half (~55%). In other embodiments, the typical efficiency achieved are estimated from 2 to 10 times, and in still other embodiments, it is estimated to be from 10 times to 1000 times for rendering a shot of frames. The latter range is believed to be achieved when rendering "bracketed" shots, as described above. In other embodiments, a greater or lesser efficiency may be achieved.

In the foregoing specification, the invention has been described with reference to specific exemplary embodiments thereof. Many changes or modifications are readily envisioned. In light of the above disclosure, one of ordinary skill in the art would recognize that any number of additional rendering steps may be introduced into the rendering process described below. In light of the above disclosure, one would recognize that for an object, such additional rendering steps may have image specific functions (time variant) and shot specific functions (time invariant). Accordingly, one would recognize that shot specific rendering may be performed on the object as little as once for the entire shot. Further, one would recognize that image specific rendering functions may be performed on the object for each image. The shot specific rendering functions would then be combined with the image specific rendering functions to form the images in the shot. It is envisioned that a great number of shaders currently compatible with RenderMan® could be used in embodiments of the present invention.

The above flow diagrams may be implemented as computer code and may or may not be compiled into processor executable code. The codes may be stored as a program in a tangible media such as a local disk drive, network storage drive, or the like. In an alternative embodiment, the codes may be dynamically generated by another program. For example, a first program may be used to generate on-the-fly an executable program that operates in the manner described above.

In embodiments of the present invention, the inventors have determined that advantages of the present schema may be applied to other rendering techniques, such as motion blur, depth of field, ray tracing, MIP mapping, texture mapping, geometric data retrieval, procedural geometric data generation, and the like.

Embodiments of the present invention may be applied to any number of rendering platforms and for a variety of purposes. For example, embodiments may be used on engineering workstations for development purposes, on visualization systems for artists and animators, in a rendering farm machine for final production, and the like. Accordingly, the concepts disclosed above are extremely valuable in a variety of applications.

In one embodiment, execution of shot specific operations for N number of objects may be processed in parallel. In another embodiment of the present invention, each of these processes may be embodied as separate and unrelated execution processes. Using a multithreaded operating system, processes may be executed at substantially the same time, may be simply overlapped in time, or the like. In a parallel processor environment, processes may actually be executed in parallel. In yet another embodiment, some processes may actually be completed before other processes. In one embodiment, if there are N objects, the rendering system spawns M processes, where $M \leq N$.

In the above disclosure, some shot-specific processes are shown executed once for the shot. However, it should be understood that embodiments may be implemented such that if there are N images, the rendering system performs the shot-invariant processes M times, where $N > M \geq 1$.

The above embodiments illustrate that time invariant shading calculations in step 390 as being performed before image specific shading calculations in steps 410, however, it should be understood that the order may also be reversed. In other embodiments of the present invention, time invariant shading calculations and image specific shading calculations may be interleaved or between, that is, when shading an object with multiple shading calculations, image specific shading calculations may be performed between time invariant shading calculations. Further, the interleaved shading operations can occur on a vertex by vertex basis of an object, and/or on all vertices at a time. As an example, a shading process may determine shading values on a first vertex of an object with the shading calculations A, B, C, D, and E in order, and then the shading process may repeat for subsequent vertices. In one case, shading calculations A, B, D, and E may be time invariant calculations, and C may be an image specific calculation; in another case, A, B, C and E may be image specific shading calculations, and D may be a time invariant shading calculation; and the like. As another example, a surface of an object having dirt is to be shaded. To shade this, the shading of the dirt is calculated separately from the shading of the surface. Further, both the dirt shading and the surface shading includes time invariant shading calculations (dirt color, surface color) and shot specific calculations (dirt reflections, surface reflections.). In one embodiment of the present invention, the order of the shading process includes first determining the dirt color, second determining the dirt reflections for all vertices, third determining the surface color, and then fourth determining the surface reflections for all vertices. This embodiment illustrates that time invariant and image specific shading calculations may be advantageously interleaved with conventional shading processes. In light of the present disclosure, many ways to interleave time invariant and image specific shading calculations are envisioned.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. For example, the image specific shading operations can be performed before the shot invariant shading operations.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for shading objects in a plurality of images including a first image and a second image comprises:
   receiving a geometric description of a first object;
   performing once for both the first image and the second image, a first set of shading operations for the first object in response to the geometric description of the first object;
   performing a second set of shading operations for the first object in the first image;
   performing a third set of shading operations for the first object in the second image;
   combining results of the first set of shading operations for the first object and results of the second set of shading operations for the first object to determine shading values of the first object in the first image; and
   combining results of the first set of shading operations for the first object and results of the third set of shading operations for the first object to determine shading values of the first object in the second image.

2. The method of claim 1
   wherein a first processing thread performs the step of performing the second set of shading operations;
   wherein a second processing thread performs the step of performing the third set of shading operations; and
   wherein the first processing thread and the second processing thread are related in a manner selected from a group consisting of: concurrent processing threads, overlapping processing threads, parallel processing threads.

3. The method of claim 1 wherein the first set of shading operations for the first object comprise shading operations for the first object in the first image that are identical to shading operations for the first object in the second image.

4. The method of claim 3 wherein the results of the second set of shading operations for the first object is specific to the first image.

5. The method of claim 3 wherein the results of the first set of shading operations for the first object are determined in response to ambient illumination values.

6. The method of claim 5 wherein the results of the second set of shading operations for the first object are determined in response to illumination values selected from a group consisting of: diffuse illumination, specular illumination.

7. The method of claim 1 further comprising receiving a determination of which shading operations for the first object are within the first set of shading operations.

8. A tangible media including the first image and the second image determined according to the method described in claim 1.

9. The method of claim 1 wherein performing at least one of the first set of shading operations is in relation to performing at least one of the second set of shading operations and performing at least one of the third set of shading operations in a manner selected from a group consisting of: before, after, between, interleaved.

10. The method of claim 1 further comprising:
    receiving a geometric description of a second object;
    performing once for both the first image and the second image, a first set of shading operations for the second object in response to the geometric description of the second object;
    performing a second set of shading operations for the second object in the first image; and
    performing a third set of shading operations for the second object in the second image;
    wherein a shading operation in the first set of shading operations for the first object is included in shading operations selected from a group consisting of: the second set of shading operations for the second object in the first image, the third set of shading operations for the second object in the second image.

11. The method of claim 1
    wherein the first object includes a first vertex and a second vertex; and
    wherein the first set of shading operations and the second set of shading operations are applied to the first vertex and the second vertex in a manner selected from a group consisting of: the first set of shading operations and the second set of shading operations on the first vertex followed by the first set the first set of shading operations and the second set of shading operations on the second vertex; the first set of shading operations on the first vertex and the second vertex, followed by the second set of shading operations on the first vertex and the second vertex.

12. A method for shading a plurality of objects in N number of images comprises:
    performing shading calculations for an object from the plurality of objects for the N number of images at one time; and
    wherein a first set of the shading calculations from the shading calculations for the object are performed M times in response to geometric data for the object; and
    wherein M<N.

13. The method of claim 12 further comprising:
    performing shading calculations for another object from the plurality of objects for the N number of images at one time; and
    wherein a first set of the shading calculations for the other object are performed M times;
    wherein M<N; and
    wherein performing shading calculations for the object is completed before performing shading calculations for the other object.

14. The method of claim 13 wherein results for the first set of the shading calculations are determined in response to ambient illumination input values.

15. The method of claim 14 wherein a second set of shading calculations for the object are performed N number of times.

16. The method of claim 12 wherein M=1, and N>1.

17. The method of claim 16 further comprising receiving a determination of the first set of shading calculations on the object that are performed M times.

18. A tangible media including images in which the object appears, wherein the object is shaded according to the method described in claim 12.

19. The method of claim 12 further comprising outputting the N number of images.

20. The method of claim 12
    wherein a second set of the shading calculations from the shading calculations for the object are performed N times; and
    wherein the first set of shading calculations are performed in relation to the second set of shading calculations in a manner selected from a group consisting of: before, after, interleaved, between.

21. The method of claim 12 wherein a set of shading calculations for the object are performed on a basis selected from a group consisting of: the set of shading calculations being performed at a first vertex on the object before the set of shading calculations are performed at a second vertex on the object; a first shading calculation from the set of shading calculations being performed on the first vertex and the second vertex before a second shading from the set of shading calculations being performed on the first vertex and the second vertex.

22. The method of claim 12 further comprising:
    performing shading calculations for another object from the plurality of objects for the N number of images at one time; and
    wherein a first set of the shading calculations from the shading calculations for the other object are performed P times in response to geometric data for the other object;
    wherein P<N; and
    wherein a shading calculation from the first set of shading calculations for the object is not within the first set of shading calculations for the other object.

23. A computer program product for shading objects in a plurality of images in a computer system including a processor comprises:
    code that directs the processor to perform a first set of shading operations for a first object M times for N number of images;
    code that directs the processor to perform a second set of shading operations for the first object N times for the N number of images; and
    code that directs the processor to combine results of the first set of shading operations for the first object and results of the second set of shading operations for the first object to determine shading values for the first object for the N number of images;
    wherein M<N; and
    wherein the codes reside on a tangible media.

24. The computer program product of claim 23 wherein the processor performs at least two shading operations from the second set of shading operations concurrently.

25. The computer program product of claim 23 wherein M>1.

26. The computer program product of claim 23 wherein code that directs the processor to perform the second set of shading operations comprises:
    code that directs the processor to perform a shading operation from the second set of shading operations for the first object for a first image, in response to input values specific to the first image; and
    code that directs the processor to perform the shading operation from the second set of shading operations for the first object for a second image, in response to input values specific to the second image.

27. The computer program product of claim 26 wherein the input values specific to the first image comprise input values selected from a group consisting of: diffuse illumination values, specular lighting values.

28. The computer program product of claim 27 wherein code that directs the processor to perform a first set of shading operations comprises code that directs the processor to perform the first set of shading operations for a first object, in response to input values common to the first image and to the second image.

29. The computer program product of claim 27 wherein the input values common to the first image and to the second image comprise ambient illumination values.

30. The plurality of images including objects rendered according to the computer program product described in claim 23.

31. The computer program product of claim 23
    wherein a first shading operation from the second set of shading operations is performed in relation to a first shading operation from the first set of shading operations being performed in a manner selected from a group consisting of: before, after.

32. The computer program product of claim 31
    wherein a second shading operation from the second set of shading operations is performed after the first shading operation from the first set of shading operations is performed; and
    wherein a second shading operation from the first set of shading operations is performed in relation to the second shading operation from the second set of shading operations being performed in a manner selected from a group consisting of: before, after.

33. The computer program product of claim 23
code that directs the processor to perform a first set of shading operations for a second object M times for N number of images;

wherein at least one shading operation is included in either the first set of shading operations for the first object or the first set of shading operations for the second object.

* * * * *